(12) United States Patent
Wood et al.

(10) Patent No.: US 8,004,529 B2
(45) Date of Patent: Aug. 23, 2011

(54) PROCESSING AN ANIMATION FILE TO PROVIDE AN ANIMATED ICON

(75) Inventors: Justin Wood, Sunnyvale, CA (US); Thomas Goossens, Paris (FR)

(73) Assignee: Apple Inc., Cupertino, CA (US)

( * ) Notice: Subject to any disclaimer, the term of this patent is extended or adjusted under 35 U.S.C. 154(b) by 965 days.

(21) Appl. No.: 11/865,550

(22) Filed: Oct. 1, 2007

(65) Prior Publication Data

US 2009/0089710 A1    Apr. 2, 2009

(51) Int. Cl.
*G06T 15/00* (2011.01)

(52) U.S. Cl. ........ 345/473; 345/474; 345/475; 704/275; 704/276

(58) Field of Classification Search ............... 345/473, 345/474, 475; 704/275, 276
See application file for complete search history.

(56) References Cited

U.S. PATENT DOCUMENTS

| | | |
|---|---|---|
| 5,854,893 A | 12/1998 | Ludwig et al. |
| 6,237,025 B1 | 5/2001 | Ludwig et al. |
| 6,351,762 B1 | 2/2002 | Ludwig et al. |
| 6,583,806 B2 | 6/2003 | Ludwig et al. |
| 6,594,688 B2 | 7/2003 | Ludwig et al. |
| 6,766,299 B1 * | 7/2004 | Bellomo et al. ............. 704/276 |
| 7,152,093 B2 | 12/2006 | Ludwig et al. |
| 7,206,809 B2 | 4/2007 | Ludwig et al. |
| 7,421,470 B2 | 9/2008 | Ludwig et al. |
| 7,433,921 B2 | 10/2008 | Ludwig et al. |
| 7,495,667 B2 * | 2/2009 | Bruggeman ................. 345/473 |
| 7,593,015 B2 * | 9/2009 | Rao ............................. 345/473 |
| 7,737,996 B2 * | 6/2010 | Gerhard et al. ............. 345/619 |
| 7,827,034 B1 * | 11/2010 | Munns ........................ 704/275 |

FOREIGN PATENT DOCUMENTS

WO    WO 2007/008050 A1  *  1/2007

OTHER PUBLICATIONS

CoffeeCup-HTML Editor, Flash & Web Design Software, http://www.coffeecup.com/gif-animator/, pp. 1-7, printed on Sep. 20, 2007.
Ulead GIF Animator Home, http://www.ulead.com/ga/runmelhtm, pp. 1-2, printed on Sep. 20, 2007.
Ulead GIF Animator Features, http://www.ulead.com/ga/features.htm, pp. 1-2, printed on Sep. 20, 2007.

* cited by examiner

*Primary Examiner* — Phu Nguyen

(74) *Attorney, Agent, or Firm* — Fish & Richardson P.C.

(57) ABSTRACT

A method for processing an animation file to provide an animated icon to an instant messaging environment is presented. An animation file is reformatted to generate the animated icon to satisfy a pre-defined size requirement of the instant messaging environment. The animated icon is stored for distribution to the instant messaging environment.

23 Claims, 11 Drawing Sheets

PROCESSING AN ANIMATION FILE TO PROVIDE AN ANIMATED ICON

TECHNICAL FIELD

This patent application relates to processing an animation file to provide an animated icon to an instant messaging environment.

BACKGROUND

Instant messaging has long been a popular service among users of computing systems. In the very beginning of instant messaging, users on instant messaging clients communicated with one another via, for example, pop-up windows that automatically presented messages from other users and provided an interface for a receiving user to write a response. More recent incarnations of instant messaging provide support audio and video conferencing. The instant messages are managed by, for example, central instant messaging service providers that handle receipt and forwarding of the messages and any accompanying content or graphics.

Instant messaging users are often provided the option of identifying themselves to others with a visualization object such as a static or dynamic digital image or icon. Selecting such images or icons can be an enjoyable part of the instant messaging experience for many users, as these icons often uniquely identify the user to others whom the user regularly communicates with.

SUMMARY

In one aspect, an animation file is processed to provide an animated icon to an instant messaging environment. The animation file is reformatted to generate the animated icon to satisfy a pre-defined size requirement of the instant messaging environment. The animated icon is stored for distribution to the instant messaging environment.

In an implementation, the animation file is formed from one or more frames in accordance with instructions received from a user.

In an implementation, the animated icon is distributed over a communications network to the instant messaging environment. The animated icon uniquely identifies a user in the instant messaging environment and the instant messaging environment is provided by an instant messaging service provider.

In an implementation, a user-selected image editing operation is applied across two or more frames of the animation file.

In an implementation, the user-selected image editing operations may include image altering effects and image filters. The image altering effects may include at least one of stretching the image, squeezing the image, mirroring the image, or warping the image. The image filters may include at least one of recoloring the image, restyling the image, or copying the image.

In an implementation, the pre-defined size requirement includes a maximum file size requirement.

In an implementation, the animation file is reformatted to generate the animated icon. Individual frames of the animation file are removed and the animation file is compressed. The acts of removing and compressing are repeated until the animated icon satisfies the pre-defined size requirement. The animation file may include delay values that correspond to the frames of the animation file. Individual frames that have corresponding delay values that are less than a pre-defined delay value are removed.

In an implementation, the animation file is reformatted to generate the animated icon. The frames of the animation file are resized and the animation file is compressed. The acts of resizing and compressing are repeated until the animated icon satisfies the pre-defined size requirement. The pre-defined size requirement includes a maximum frame size requirement.

In an implementation, the animation file is reformatted to generate the animated icon. Individual frames of the animation file are removed. The frames of the animation file are removed. A color palette is dropped from the animation file. The animation file is compressed. The acts of removing, resizing, dropping, and compressing are repeated until the animated icon satisfies the pre-defined size requirement.

In an implementation, the animation file is reformatted to generate the animated icon. Individual frames of the animation file are removed. The animation file is compressed. The animation file is compared with the pre-defined size requirement. If the animation file exceeds the pre-defined size requirement, the acts of removing, compressing, and comparing are repeated until the pre-defined size requirement is satisfied. If the animation file does not exceed the pre-defined size requirement, the animated icon is generated.

In an implementation, the instant messaging environment includes one of several instant messaging environments. The pre-defined size requirement includes a single maximum file size requirement that represents a least common denominator value acceptable to the instant messaging environments. The instant messaging environments are provided by multiple instant messaging service providers.

In an aspect, an animated icon editor is integrated within an instant messaging application for reformatting and modifying an animation file that includes frames. The animated icon editor includes a reformatting process, a modifying process and a storage process. The reformatting process is configured to automatically manipulate one or more frames of the animation file to satisfy sizing parameters. The modifying process is configured to apply image editing operations to two or more frames of the animation file. A storage process is configured to store an animated icon generated by the reformatting process and the modifying process from the animation file.

In an implementation, the animated icon editor includes a formation process configured to build the animation file from the frames.

The foregoing method may be implemented as a computer program product comprised of instructions that are stored on one or more machine-readable media, and that are executable on one or more processing devices. The foregoing method may be implemented as an apparatus or system that includes one or more processing devices and memory to store executable instructions to implement the method. A graphical user interface may be generated that is configured to provide a user with access to and at least some control over stored executable instructions to implement the method.

The details of one or more examples are set forth in the accompanying drawings and the description below. Further features, aspects, and advantages are apparent in the description, the drawings, and the claims.

DETAILED DESCRIPTION

Figure 1:
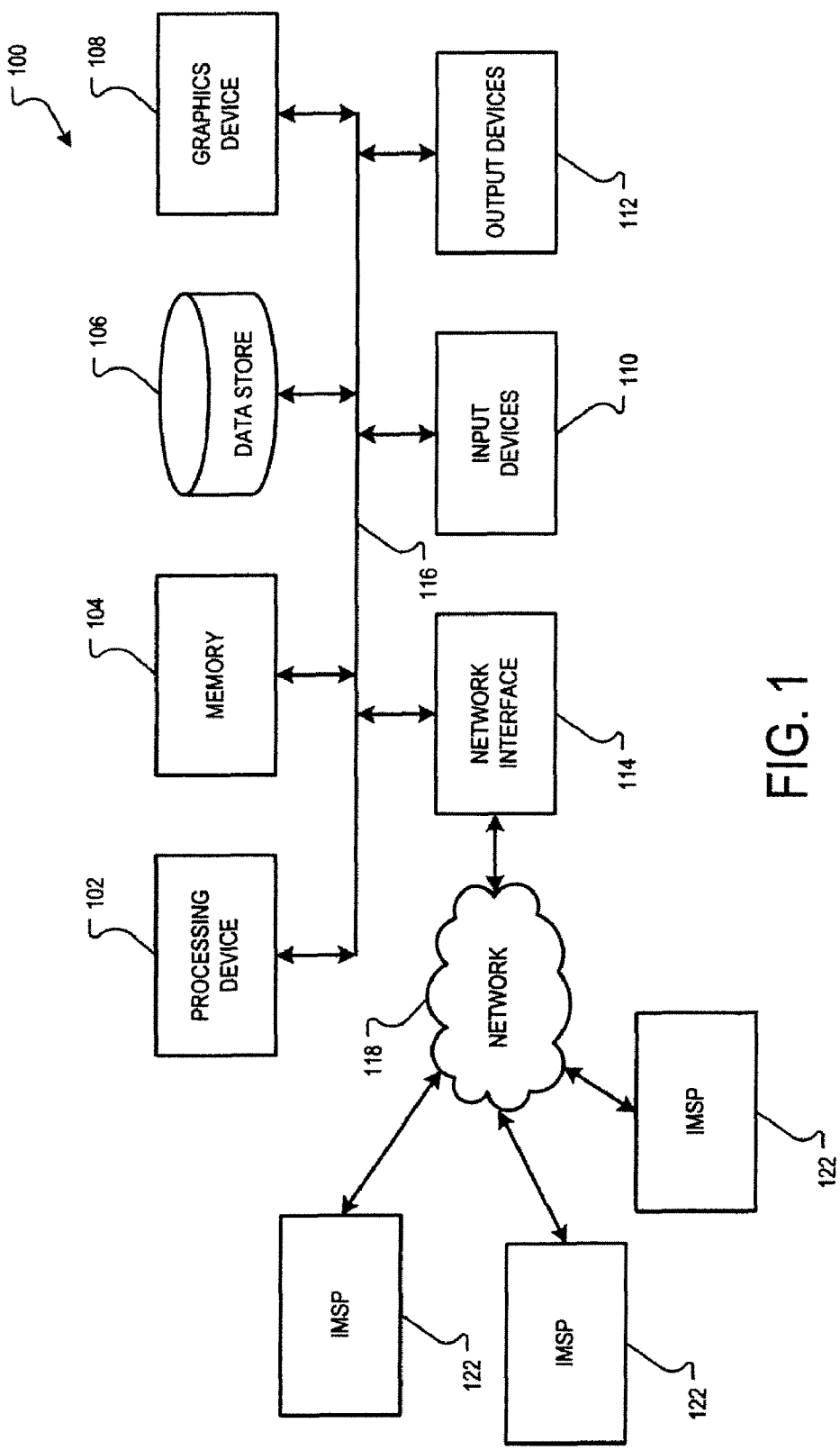
FIG. 1 is a block diagram of an example system that can be utilized to implement the systems and methods described herein.

FIG. 1 is a block diagram of an example system 100 that can be utilized to implement the systems and methods described herein. The system 100 can, for example, be implemented in a computer device, such as any one of the personal computer devices available from Apple, Inc.®, Cupertino, Calif., or other electronic devices. Other example implementations can also include video processing devices, multimedia processing devices, portable computing devices, portable communications devices, set top boxes, personal digital assistants, etc.

The example system 100 includes a processing device 102, a first data store or memory 104, a second data store 106, a graphics device 108, input devices 110, output devices 112, and a network interface 114. A bus system 116, such as a data bus and a motherboard, can be used to establish and control data communication between the components 102, 104, 106, 108, 110, 112 and 114. Other system architectures, however, may be used.

The processing device 102 may include one or more microprocessors. The first data store 104 may include a random access memory storage device, such as a dynamic random access memory, or other types of machine-readable medium memory devices. The second data store 106 may include one or more hard drives, a flash memory, and/or a read only memory, or other types of machine-readable medium memory devices.

The graphics device 108 may include a video card, a graphics accelerator card, or display adapter and is configured to generate and output images to a display device. In one implementation, the graphics device 108 can be realized in a dedicated hardware card connected to the bus system 116. In another implementation, the graphics device 108 can be realized in a graphics controller integrated into a chipset of the bus system 116. Other implementations can also be used.

Example input devices 110 can include a keyboard, a mouse, a stylus, a video camera, etc., and example output devices 112 can include a display device, an audio device, etc.

The network interface 114 may include a wired or wireless network device operable to communicate data to and from the network 118. The network 118 may include one or more local area networks (LANs) or a wide area network (WAN), such as the Internet.

One or more instant messaging service providers (IMSPs) 122 communicate with and via the network 118, for example, receiving, managing, and forwarding instant messages via the network 118. The IMSPs 122 may include a service provider for Apple, Inc.'s® Bonjour™ service. Other services can include the America Online (AOL)® Instant Messenger™ or AIM® service, the Jabber® service, MSN® Messenger and Yahoo!® Messenger. In general, the IMSPs 122 support and provide instant messaging environments that support animated icon files and that have may have size requirements that animated icon files must satisfy.

In an implementation, the system 100 includes instructions defining an operating system stored in the first data store 104 and/or the second data store 106. Example operating systems can include the MAC OS® series operating system, the WINDOWS® based operating system, or other operating systems. Upon execution of the operating system instructions, access to various system objects is enabled. Example system objects include data files, applications, functions, windows, etc. To facilitate an intuitive user experience, the system 100 includes a graphical user interface that provides the user access to the various system objects and conveys information about the system 100 to the user in an intuitive manner.

In an implementation, the operating system includes an instant messaging client application, for example, the iChat instant messaging client from Apple, Inc.®

Figure 2:
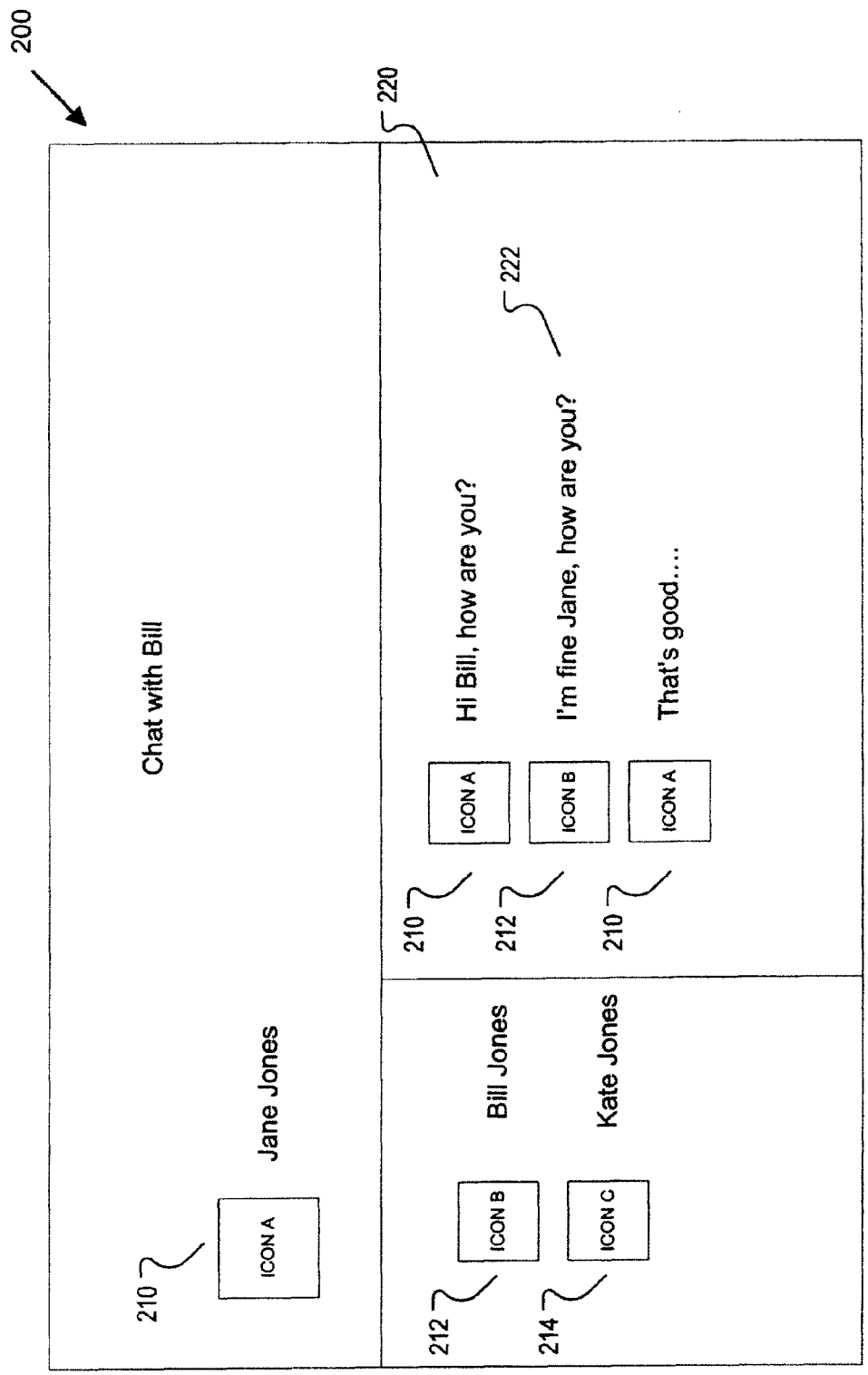
FIG. 2 is an example instant messaging desktop environment including icons.

FIG. 2 is an example instant messaging desktop environment 200 including icons. The example instant messaging desktop environment 200 of FIG. 2 can be displayed by the output device 112 of FIG. 1. As shown in FIG. 2, a user, Jane Jones has an icon 210 to identify her to other users of the instant messaging service. Jane's friends, Bill Jones and Kate Jones, have respective icons 212, 214 to similarly serve as visual identifiers. A conversation display pane 220 shows an online conversation 222 occurring between two participants, Jane Jones and Bill Jones, with Jane Jones communicating first and third, as illustrated by Jane's icon 210, and Bill Jones communicating second, as illustrated by Bill's icon 212. The instant messaging desktop environment 200 may support real-time audio and visual communication and conferencing (not shown) as well as text messaging.

Instant messaging service providers such as the IMSPs 122 of FIG. 1 permit users of their services and instant messaging clients to use animated icons such as the icons 210, 212, and 214 of FIG. 2. The animated icons are typically transported via the Internet and/or other network(s) as animation files. An animation file, such as a GIF animation file, is made of image frames arranged in sequence to form the animation file. Individual frames of the animation file have associated durations, or delay values, i.e., times during which the animation file will display those particular frames. Certain frames of the animation file, such as ones that have a longer duration relative to other frames, could be considered "key" frames as these frames contribute more toward the full animation file from the perspective of one playing back the file for viewing. For example, if a file has 10 frames and eight of the frames last for one second, and the other two frames last for three seconds, and four seconds, respectively, it is clear that these other two frames are "key" frames for the animation file. If these frames were removed, the playback quality and integrity of the animation file may be greatly affected. A user would likely notice that these frames were missing if she viewed the animation file with these frames and then the file without these frames. Although GIF animation files has been described, any animation file may be used, such as, for example, a JPEG file, or a BMP file.

These animated icons popular in instant messaging create issues for instant messaging service providers such as the IMSPs 122 of FIG. 1. Some hundreds of thousands of these animated icons travel back and forth to these service providers, who must, at least temporarily, handle the animated icon files. The size of these animation files can place a strain on the servers and network infrastructure of these IMSPs, so generally many IMSPs have size requirements of some sort that limit the overall burden of these animation files. For example, Apple, Inc.'s® Bonjour™ service presently requires that animated icon files satisfy a file size limit of 7 K. The America Online (AOL)® Instant Messenger™ or AIM® service has in recent years had differing size limits for animated icon files, and presently has a maximum file size requirement of 7 K for any animated icon file sent via the service. Other services, such as the Jabber® service, have no size requirement. The size requirement may also be dimensional. For example, an IMSP may have a frame size requirement, such as an aspect ratio requirement. In the case of the AIM® service, the frames size of frames of animated icon files must not exceed 64 by 64 and must be greater than 16 by 16.

Figure 3:
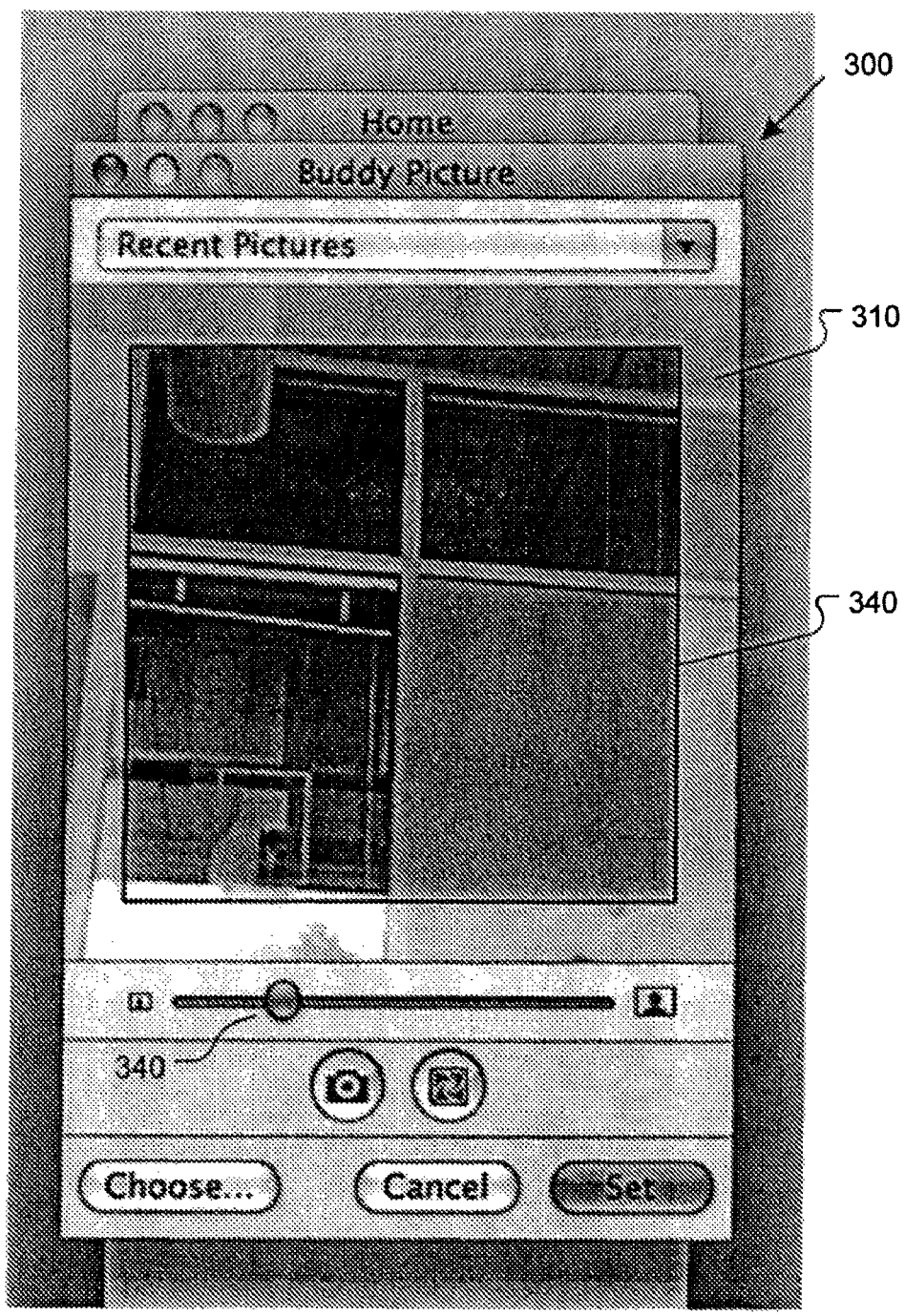
FIG. 3 is an example icon editor window in an instant messaging desktop environment.

FIG. 3 is an example icon editor window 300 in an instant messaging desktop environment. With functionality in and displayed in the icon editor window 300, visualization objects such as static or dynamic icons may be displayed, formed, or recognized, operated on with image editing operations, and/or reformatted by post processing. As described herein, the post processing/reformatting performed by the icon editor results in animated icon files that substantially meet pre-defined size requirements and specifications set by the IMSPs. This post processing/reformatting may limit the amount of image and playback degradation in the resulting animated icon file so as to provide a relatively high quality image file when compared to the original animation file prior to the post processing/reformatting. In an implementation, the pre-defined size requirements may be hard-coded into the application underlying the instant messaging desktop environment. In other implementations, the pre-defined size requirements or other parameters for post-processing/reformatting may be established interactively from a user or from IMSPs.

In one implementation, the icon editor window 300 provides an animation recognition feature so that a user may drag and drop an animation file from, for example, the Internet onto the icon editor window 300 and the program will recognize the file as an animation file and display the animation file for editing by the user.

In another implementation, the icon editor window 300 also allows a user control over forming an animation file from scratch, i.e., from one or more individual digital images that can be used as frames. Numerous animated GIF editors showcasing standard animated GIF techniques are available via the Internet, such as CoffeeCup GIF Animator 7.5 from CoffeeCup Software, available at http://www.coffeecup.com/, and ULead® GIF Animator™ 5 from Corel Corporation, available at http://www.ulead.com/. For example, a user may build or form an animation file by selecting individual digital images and then assigning delays for each individual images. An interface such as a frame editor (not shown) from icon editor window 300 can allow a user to select images for frames and then associate the frames together to form an animation file.

In a variation on this implementation, a user can drag or drop two individual digital images onto the icon editor window 300, and assign one image as the beginning frame and the other image as the ending frame. The user can then select a motion path tool (not shown) from icon editor window 300 that will build or form an animation file using the one image as the beginning frame, the other image as the ending frame, and then will interpolate the intervening frames producing an animated metamorphosis of the one image through to the other image. The motion path tool of icon editor window 300 further allows formation of an animation file from more than two starting images, i.e., intermediate images can be used and interpolations made between the intermediate images and the beginning and end images to form an animation file.

In an implementation, a user can drag or drop a movie file onto the icon editor window 300. The user can then select with a tool (not shown) a portion of time of the movie file that will be used to build or form an animation file. The animation file would be formed via extraction of image frames corresponding to the portion of time from the movie file.

The icon editor window 300 shown in FIG. 3 includes a display area 310 that shows frames of the animation file. In this example, an animation file was dragged and dropped into the display area 310 and the window 300, but could likewise have been formed from scratch, etc. The animation file may play continuously and repeatedly in the display area 310 of the icon editor window 300. A sliding control 320 permits a user to zoom in on (or out on) frames of the animation file within a crop area 340. The crop area 340 is defined by the solid line in display area 310 and represents a resized frame. By moving the sliding control 320, a user can determine what portion of the animation file frame will appear within the crop area 340. In the example illustrated in FIG. 3, a user can resize a frame to display the portion within the crop area 340. The animation file will automatically be resized, so that all frames of the resulting animation file will reflect the change in frame size. In other implementations, the change in size can affect less than all of the frames of the resulting animation file. Although a resizing action is shown in FIG. 3, this merely an example of actions that a user may be perform on the animation file. In an implementation, the post-processing/reformatting results in an animation file that not only has frames resized according to the user's desires, but that also meets the pre-defined size requirement(s) set by IMSPs.

In another implementation, the window 300 permits focus on a static frame of the image file and may include a sliding control (not shown) that permits a user to move from the beginning of the animation file to the end of the file, so that successive frames of the animation file would appear in the window 300 as the control is moved.

Figure 4:
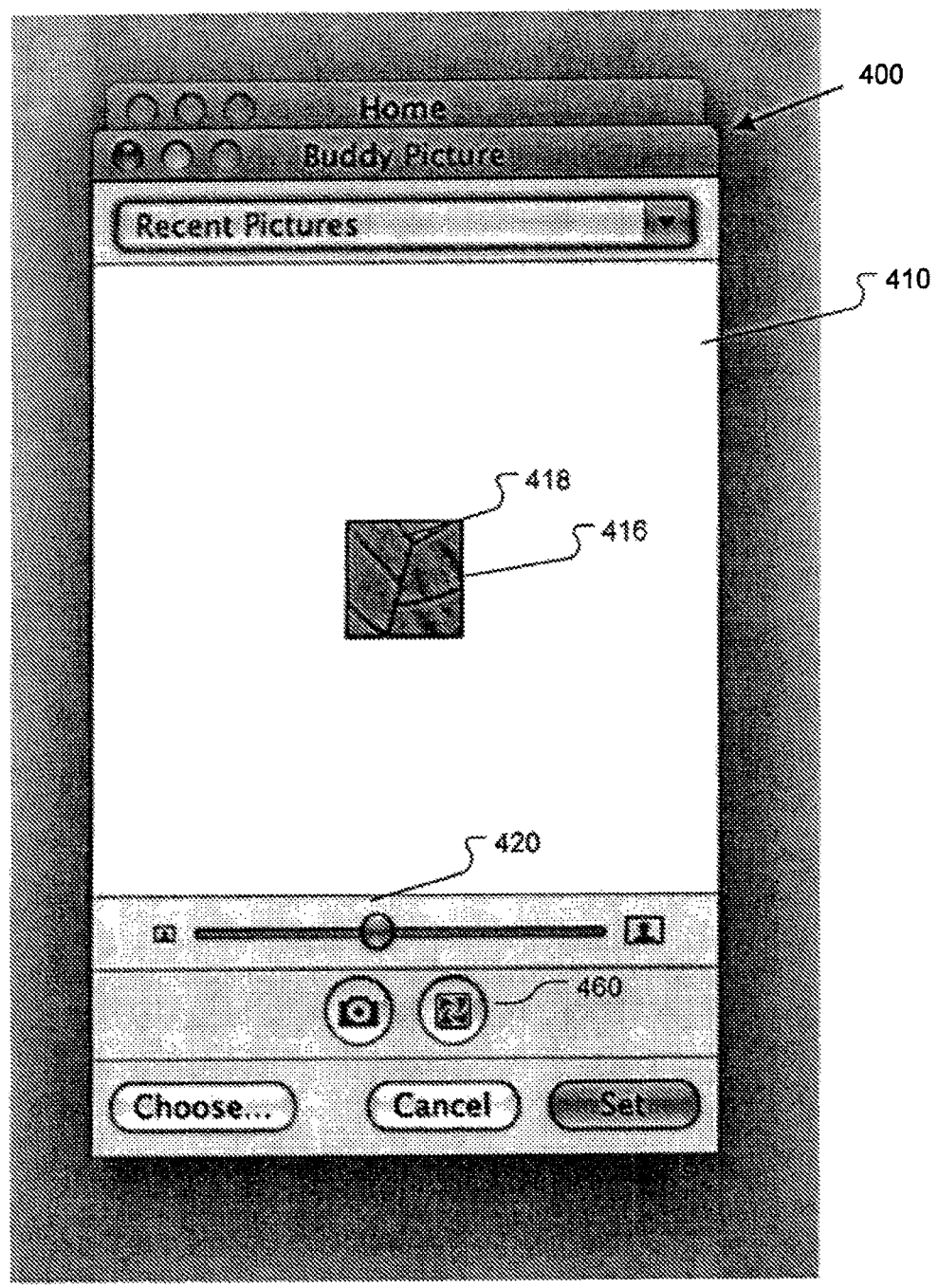
FIG. 4 is another example icon editor window in an instant messaging desktop environment.

FIG. 4 is another example icon editor window 400 in an instant messaging desktop environment. The icon editor window 400 includes a display area 410 that shows frames of the animation file. In this example, the icon editor window 400 shows one frame 418 of an animation file within a crop area 416. The animation file may play continuously and repeatedly in the display area 410 of the icon editor window 400. A sliding control 420 permits a user to zoom in on (or out on) frames of the animation file within the crop area 416. The crop area 416 is defined by the solid line in display area 410 and represents a resized frame. The example icon editor window 400 includes a control button 460 that permits a user to select image editing operations to apply to the animation file. Clicking on the control button 460 will bring up a tool (see FIGS. 5 and 6) that allows a user to select from a variety of image altering effects and image filters to be applied to the frames of the animation file.

In another implementation, the window 400 permits focus on a static frame of the image file and may include a sliding control (not shown) that permits a user to move from the beginning of the animation file to the end of the file, so that successive frames of the animation file would appear in the window 400 as the control is moved.

Figure 5:
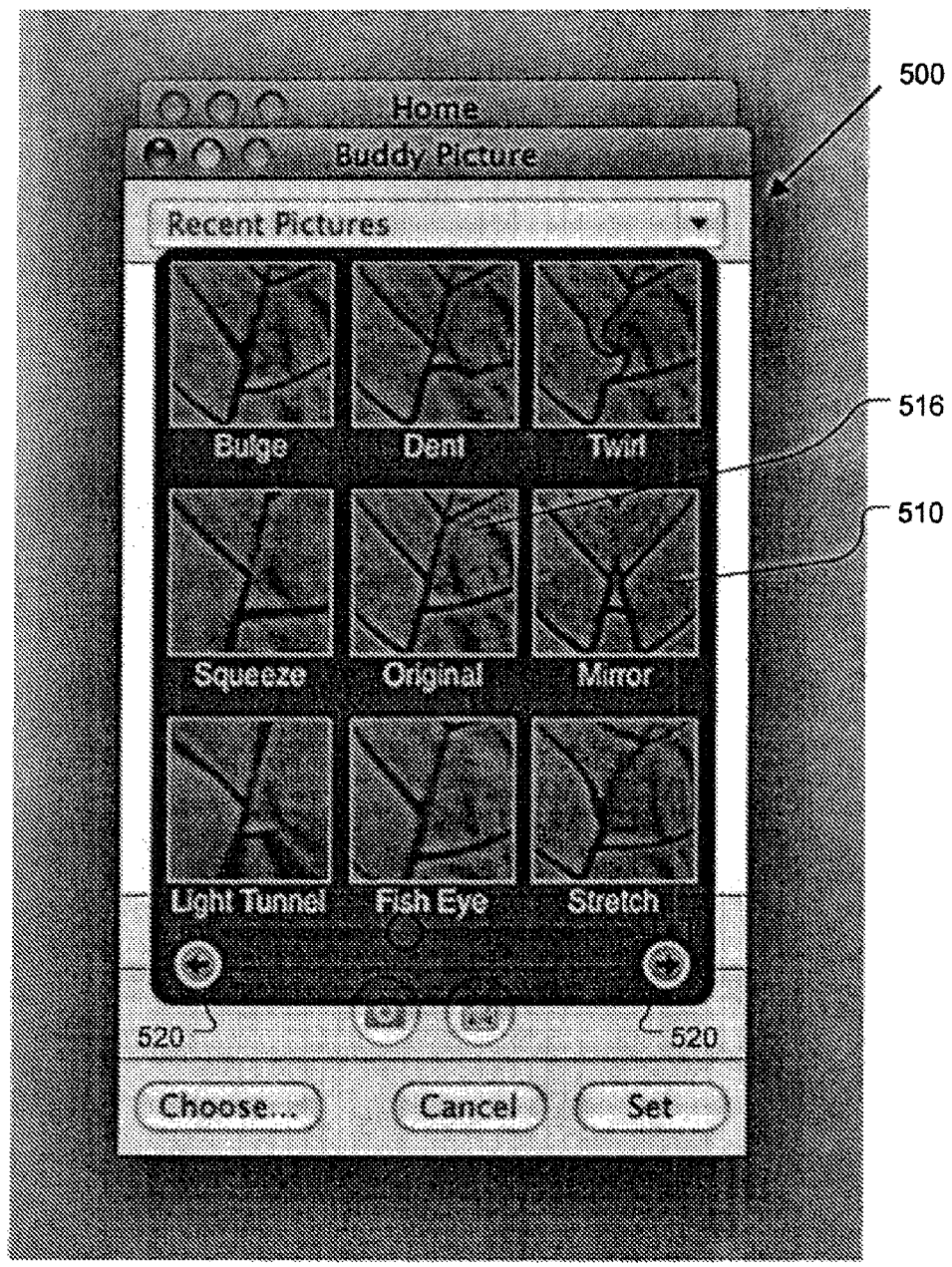
FIG. 5 is an example icon editing tool window opened from the icon editor window.

FIG. 5 is an example icon editing tool window 500 opened from the icon editor window. The icon editing tool window 500 shows a series of image altering effects that may be applied to frames of the animation file. In this particular example, eight such effects, including bulging, denting, twirling, squeezing, mirroring, light tunneling, fish eyeing, and stretching are shown but of course more or fewer effects may be used. The image effects may include other standard effects ubiquitous in animation and photo editor programs, such as distortion effects, but in other implementations may also include user-defined effects. The window 500 provides a glimpse of what an individual frame of the animation file will look when a displayed image altering effect, such as mirroring 510, is applied. The original individual frame image 516 (the frame active when the icon editing tool was selected) is included for comparison in window 500. Arrow controls 520 permit a user to move between groups of image editing operations, for example to the group shown in FIG. 6. Once a particular image altering effect such as mirroring 510 is selected (by, for example, clicking on the displayed effect in window 500), the effect will be automatically applied so that all frames of the resulting animation file will reflect the desired effect. In other implementations the selected image altering effect can affect less than all of the frames of the resulting animation file.

In an implementation, post-processing/reformatting subsequent to the image altering effects being applied results in an animation file that not only has frames with the selected image altering effect, but that also meets the pre-defined size requirement(s) set by IMSPs.

Figure 6:
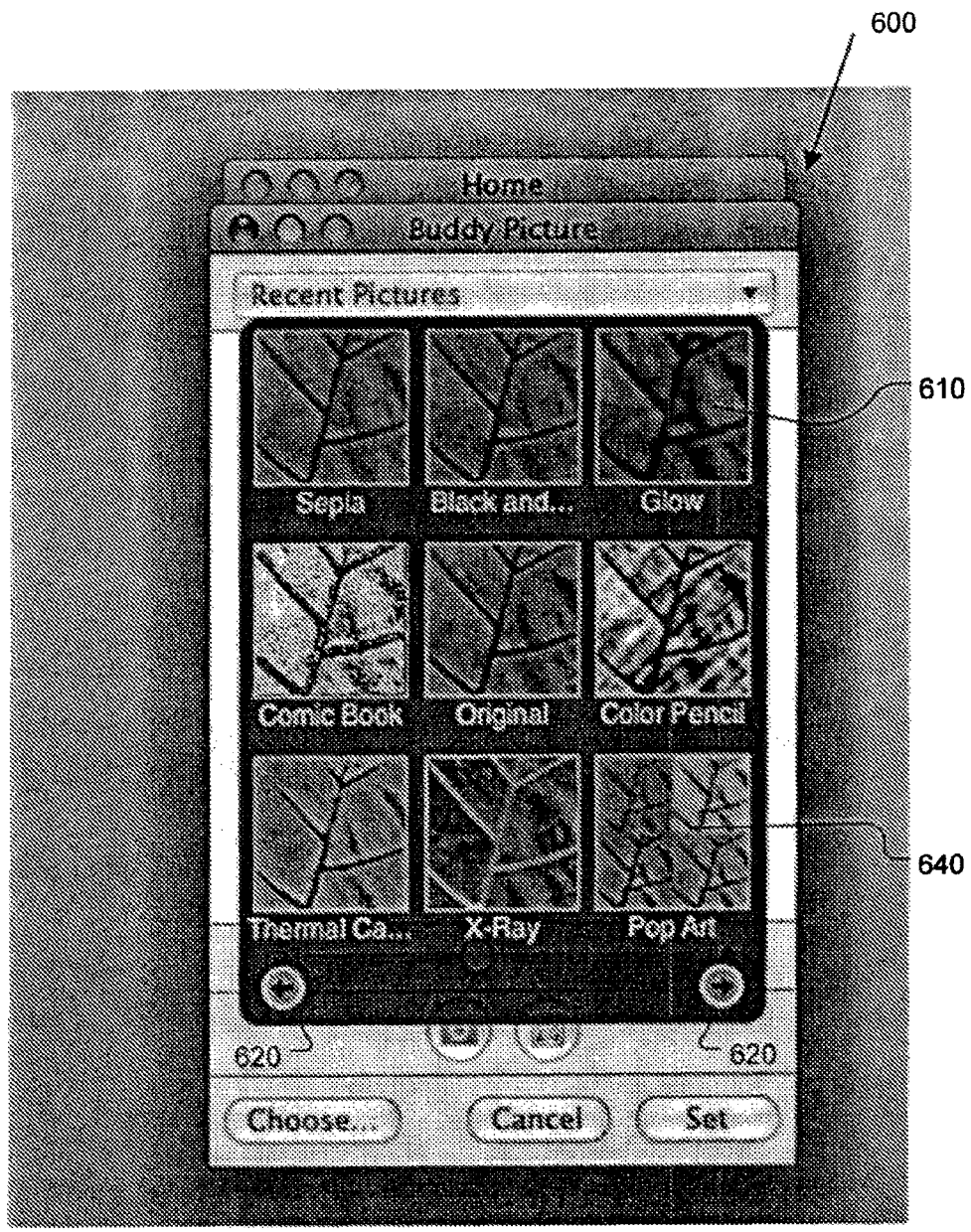
FIG. 6 is another example icon editing tool window opened from the icon editor window.
Figure 7:
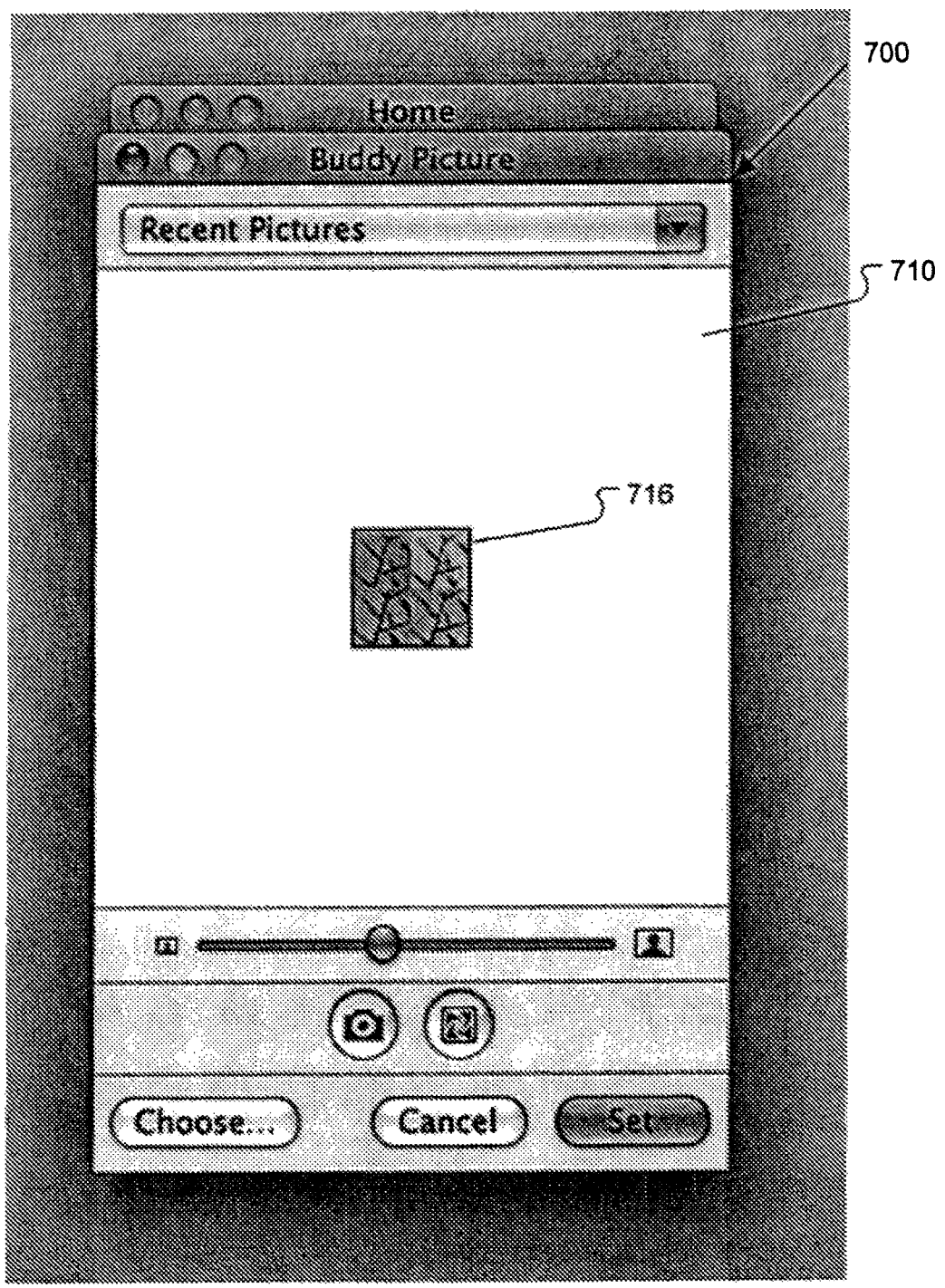
FIG. 7 is another example icon editor window in an instant messaging desktop environment.

FIG. 6 is another example icon editing tool window 600 opened from the icon editor window. Here, a different animated icon file is being used, this time illustrating a view of the Earth. In this example, the icon editing tool window 600 displays image filters that would apply glow, x-ray, and other color and shading type image edits, to frames of the animation file. The image filters may include other standard filters ubiquitous in animation and photo editor programs, such as image coloring, image restyling, or image copying (making multiple copies on image within a frame, e.g., "Pop Art" 640 in FIG. 6), sharpness filters, contrast filters, embossing filters, chalk filters, blur filters, silkscreen-style filters, but in other implementations may also include user-defined filters. Arrow controls 620 permit a user to move between groups of image editing operations, for example to the group shown in FIG. 5. Selecting a particular image filter such as a glow image edit 610, by, for example, clicking of the displayed filter in window 600, will cause the filter to be automatically applied so that all frames of the resulting animation file will reflect the image filter edits. This is, illustrated, for example, in FIG. 7, which shows a single frame 716 of the resulting filtered animation file (using the displayed filter "Pop Art" 640 in FIG. 6) in display area 710 of an icon editor window 700. The animation file may play continuously and repeatedly in the display area 710 of the icon editor window 700. In other implementations the selected image filters can affect less than all of the frames of the resulting animation file.

In an implementation, post-processing/reformatting subsequent to the image filters being applied results in an animation file that not only has frames with the selected image filtering, but that also meets the pre-defined size requirement(s) set by IMSPs.

In an implementation, an icon editor window such as icon editor window 300 of FIG. 3 is the primary backdrop and user interface for certain actions performed according to the following processes 800 through 1100 of FIGS. 8-11. In this implementation, icon editor window 300 is part of the example instant messaging desktop environment 200 of FIG. 2 that can be displayed by the output device 112 of system 100 of FIG. 1. The processing device 102 of system communicates with first and second data stores 104, 106 via bus system 116. An operating system, such as the MAC OS® X Leopard operating system, may offer an instant messaging client application that provides access to system objects through instructions executed by processing device 102. This implementation is merely one backdrop and environment that the following processes may be described with regard to, and many other implementations and system arrangements are possible.

Figure 8:
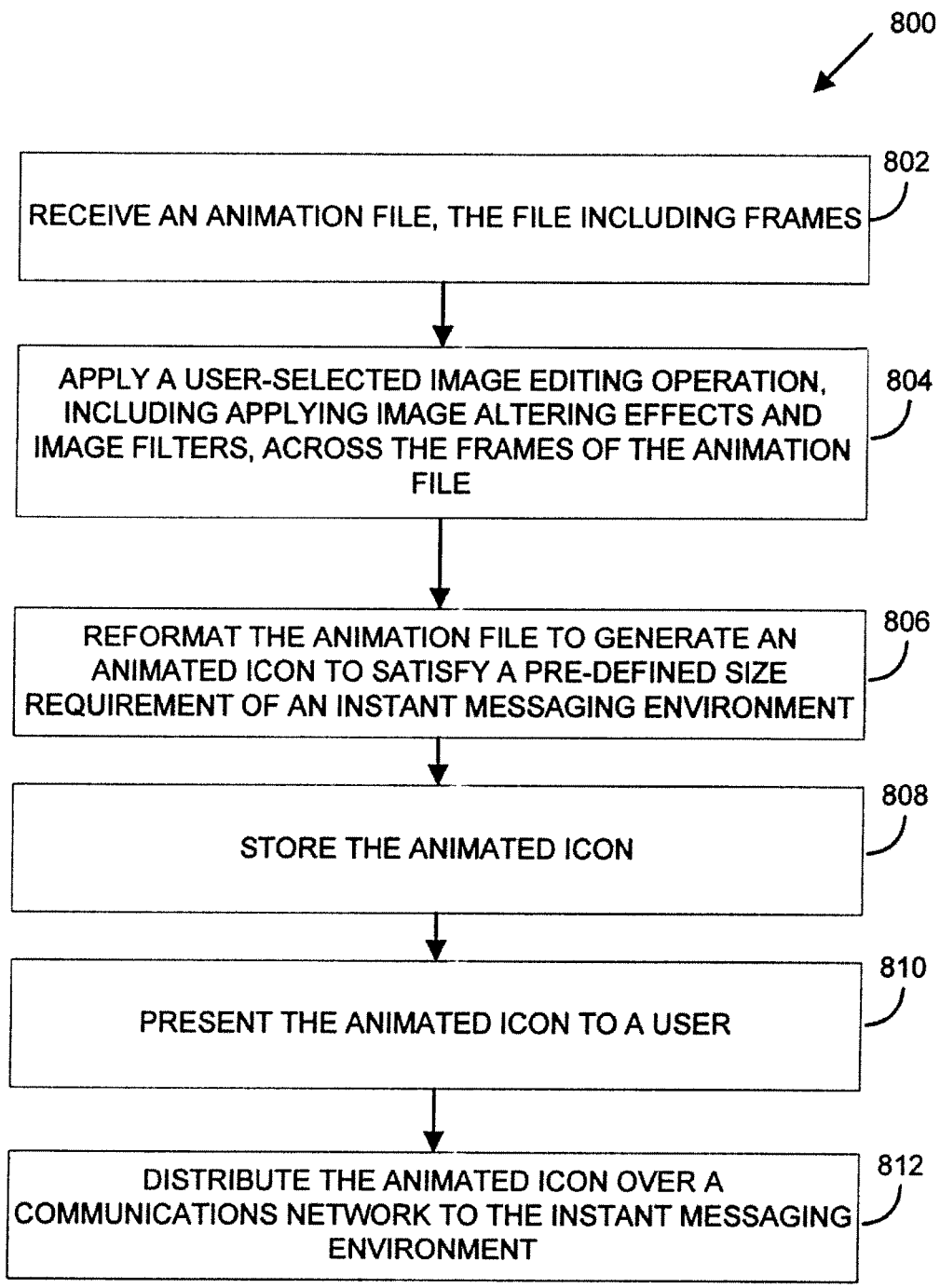
FIG. 8 is a flow diagram of an example process performed on an animation file to provide an animated icon to an instant messaging environment.

FIG. 8 is a flow diagram of an example process 800 performed on an animation file to provide an animated icon to an instant messaging environment. In an implementation, the animated icon is used as a representation of an instant messaging user in the instant messaging environment. The processing device 102 receives (802) an animation file via icon editor window 300. The animation file includes frames. In one implementation, the icon editor window 300 recognizes the animation file when a user, e.g., drags and drops the file from the Internet or another program, or simply retrieves an animation file from data stores 104, 106. In another implementation, the icon editor window 300 also allows a user full control over forming an animation file from scratch, i.e., from one or more individual digital images that can be used as frames. Put more generally, the action of receiving (802) can include forming an animation file from one or more frames in accordance with instruction received from a user. In a variation on this implementation, a motion path tool from icon editor window 300 permits formation of an animation file from two or more starting images, through interpolations performed using the beginning and end images and any intermediate images. In any event, an animation file is received (802) by the processing device 102.

The processing device 102, in, for example, a modifying process, applies (804) a user-selected image editing operation across the frames of the animation file. In an implementation, the applied image editing operation can include image altering effects and image filters selected by a user at the icon editor window 300, or in one implementation, at icon editing tools windows, such as windows 500, 600 of FIGS. 5 and 6. Numerous image altering effects and image filters to apply to images on the frames are possible, as shown in FIGS. 5 and 6. The image altering effects can include stretching, squeezing, mirroring, and warping an image, while image filters can include coloring (or recoloring), styling (or restyling), and copying (i.e., presenting multiple copies of an image within a frame) an image. Of course, an instant messaging desktop environment need not include all of these effects and filters. Both pre-defined and user-defined effects are possible. In an implementation, the user-selected image editing operation is applied (804) across all frames of the animation file, but in other implementations, the operation may be applied to less than all frames.

The processing device 102, in, for example, a reformatting process, reformats (806) the animation file to generate an animated icon. The animated icon satisfies a pre-defined size requirement of an instant messaging environment. The pre-defined size requirement may include a either a file size requirement, or a frame size requirement, or both. Instant messaging environments such as those provided by instant messaging service providers IMSPs 122 of FIG. 1 often set file and/or frame size requirements for, e.g., animated icon files distributed to them to minimize the burdens on the IMSPs' servers and network infrastructure. Typically, the file size requirement is a maximum file size requirement, while the frame size requirement can be either a maximum or minimum requirement, or both. In other implementations, other, non-size related parameters or criteria may be used as requirements instead of, or in addition to, the size requirements. In an implementation, an animated icon editor integrated within an instant messaging application includes a formatting process configured to automatically manipulate frames of an animation file to satisfy sizing parameters.

Depending on the implementation, the reformatting (806) of the animation file by the processing device 102 may generate a single animated icon that, for example, meets a least common denominator size requirement of all known or supported services, or a desired subset of services. That is, a first service, such as Apple, Inc.'s® Bonjour™ service, or the America Online America Online (AOL)® Instant Messenger™ or AIM® service, may have one or more size requirements, while a second service, such as the Jabber® service, might have no size requirements, or less exacting size requirements than the first service. In the event of a least common denominator/worst case criteria implementation, a single animated icon would be generated by reformatting (806) that would meet the first service provider's most exacting size requirements, but that would also automatically satisfy the second service's less exacting requirements.

In another implementation, the processing device 102 may perform the action of reformatting (806) multiple times to generate multiple animated icons that are tailored to the particular size requirements of corresponding instant messaging environments provided by providers such as IMSPs 122. It may be also that the action of reformatting (806) generates multiple animated icons similarly tailored. One may perform the latter, tailored, actions since a least common denominator implementation would mean that the animated icon may be unnecessarily small (in terms of file size and/or frame size) for certain instant messaging environments. Either implementation is suitable.

The animated icon generated by the reformatting action is stored (808) in, e.g., data stores 104, 106. Optionally, the animated icon is presented (810) to a user, who might, for example, then perform editing on the icon to attempt to improve the quality of the icon if desired. In that event, the processing device would again reformat (as in 806) the animated icon (as an animation file) in response to any editing by the user.

In an implementation, the original animation file and data regarding the processing actions selected by the user and performed on the file, e.g., user selected editing operations, resizing, etc., may be stored in data stores 104, 106 to permit a user to re-edit or adjust the processed animated file. For example, a user may re-open the original animation file and change the filter or re-adjust the frame size to produce a new animated icon.

The animated icon is distributed (812), at the direction of processing device 102, over a communications network such as network 118 (via a network interface 114) to the instant messaging environment(s), such as those provided by the instant messaging service provider(s) IMSP(s) 122 of FIG. 1.

Figure 9:
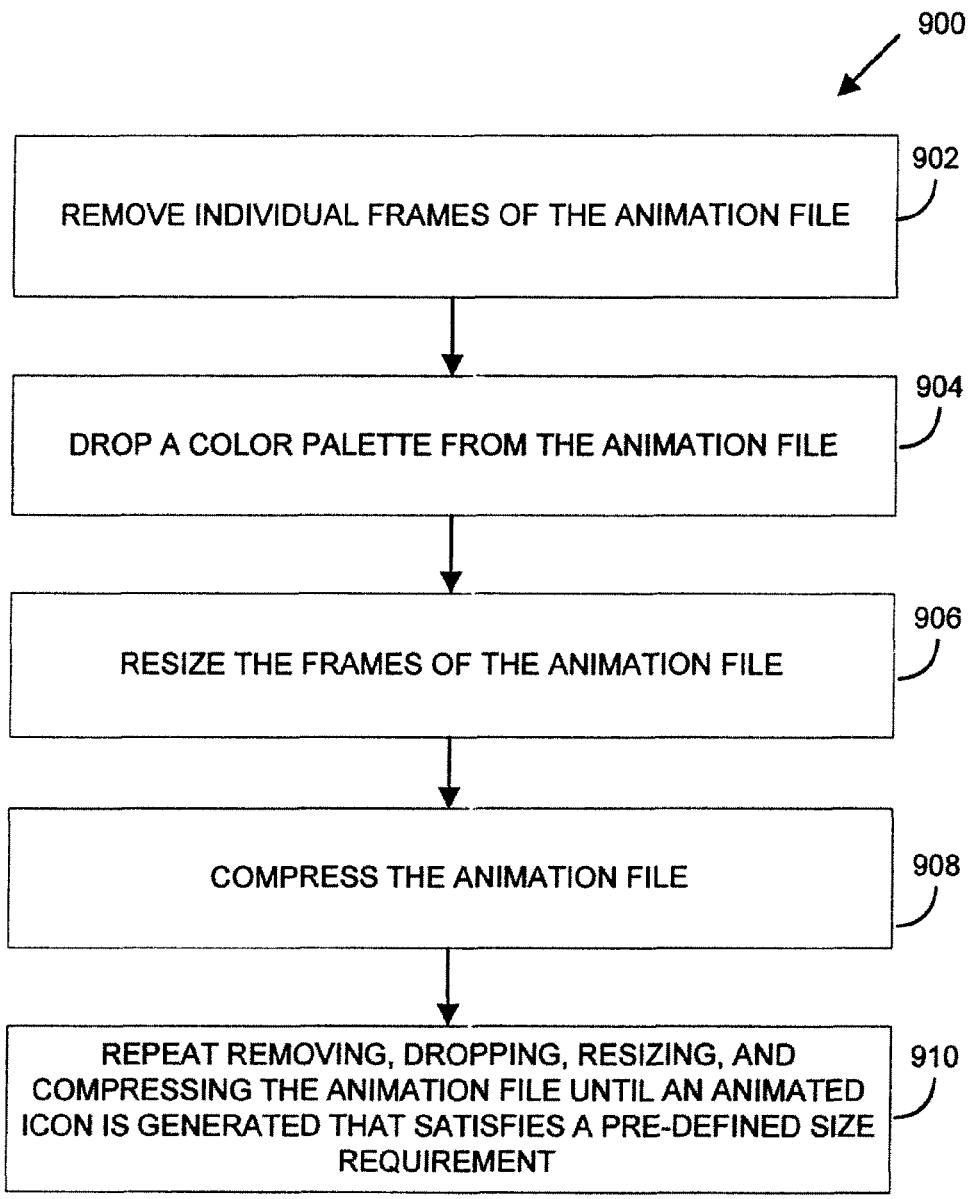
FIG. 9 is a flow diagram of an example process of reformatting an animation file to generate an animated icon to satisfy pre-defined size requirements of an instant messaging environment.
Figure 10:
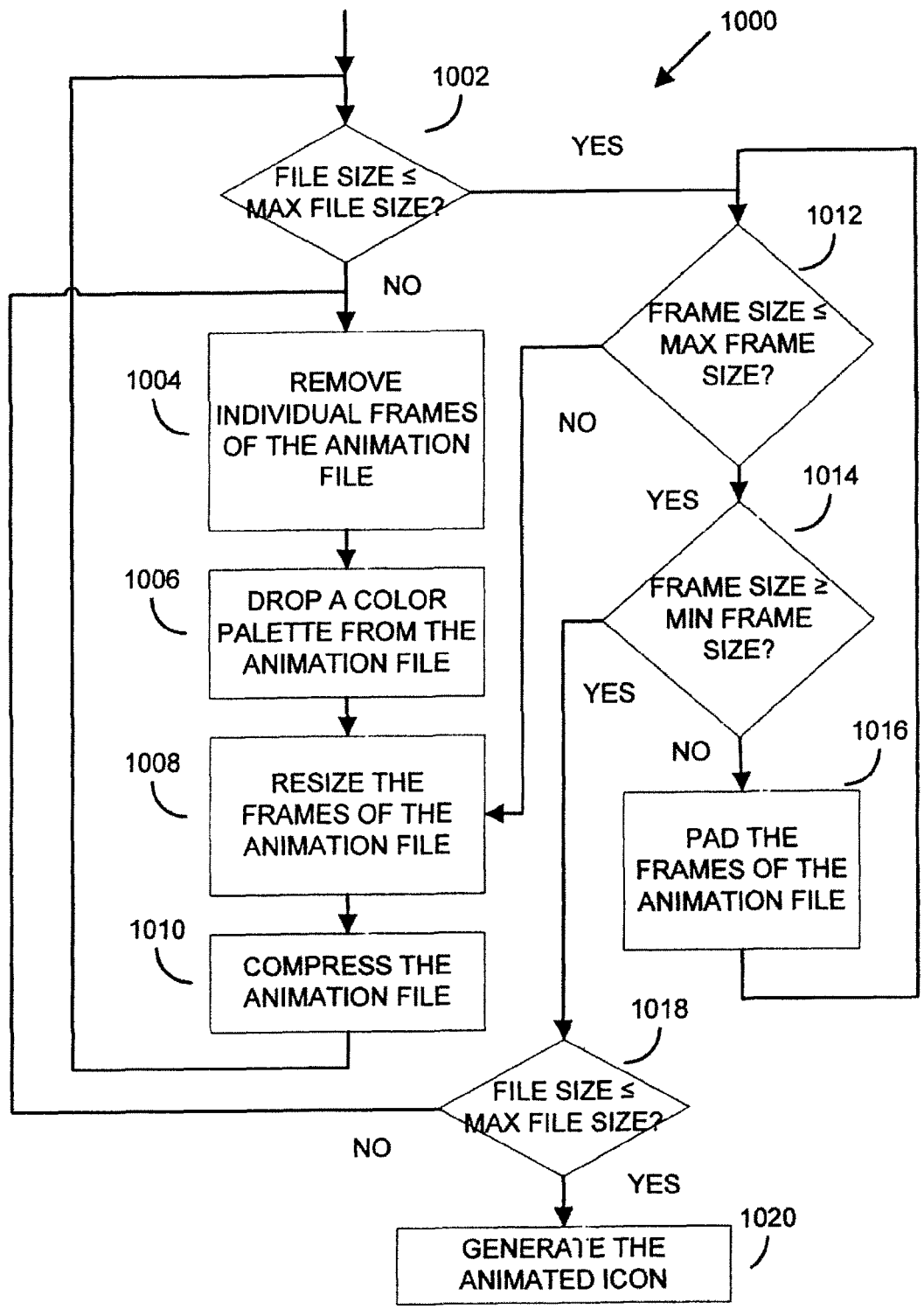
FIG. 10 is a flow diagram of another example process of reformatting an animation file to generate an animated icon to satisfy pre-defined file and frame size requirements of an instant messaging environment.
Figure 11:
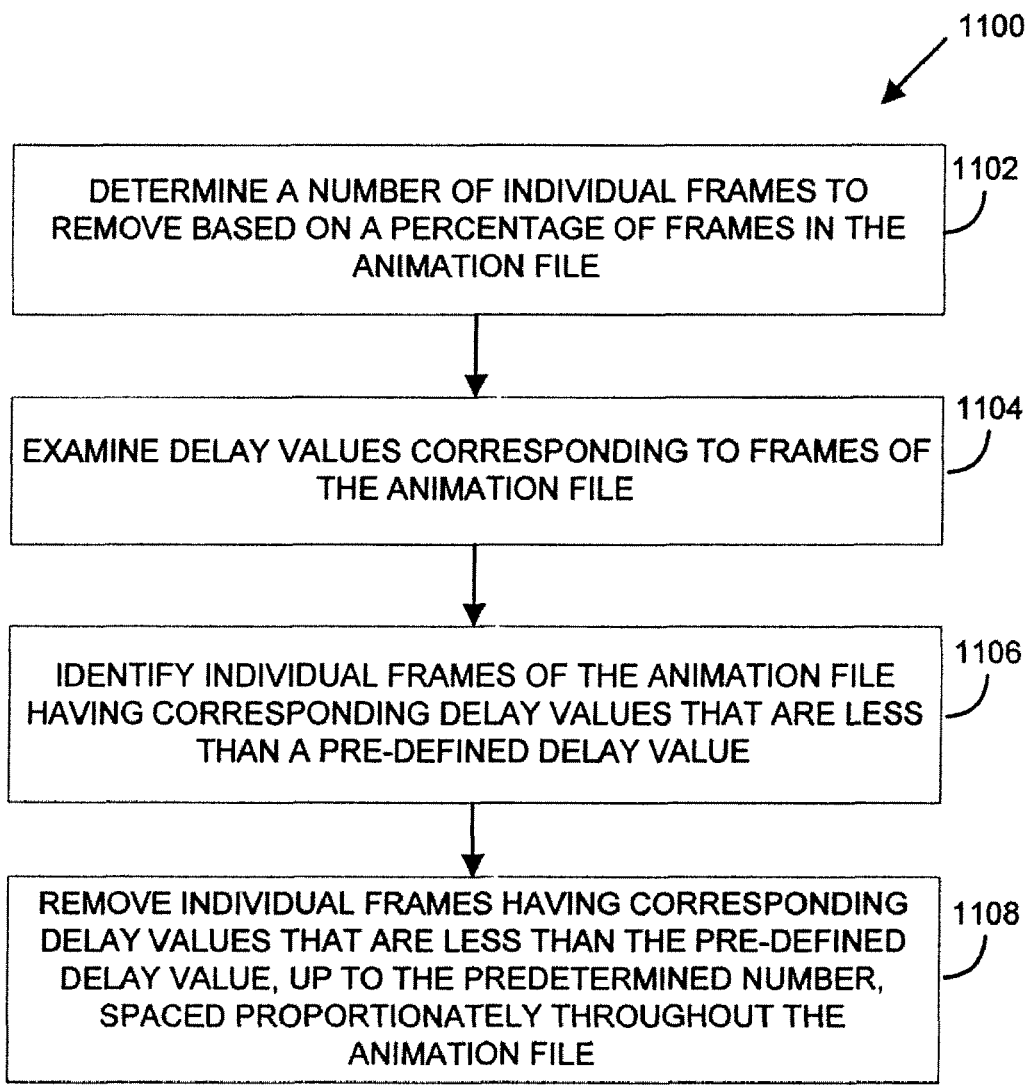
FIG. 11 is a flow diagram of an example process of removing individual frames of an animation file.

The action of reformatting (806) is described in more detail with regard to example processes 900 to 1100 of FIGS. 9-11. In an implementation, the reformatting (806) of FIG. 8 happens automatically upon a change or edit being applied to the animation file in the icon editor window 300, but in other implementations, the reformatting can also occur at the specific direction of a user.

The action of reformatting (806) may be performed in various ways. In an implementation, the reformatting (806) is performed to limit image and playback degradation in the animated icon. A reformatting process that fails to take into account image quality and other factors, such as the playback of an animated icon file with removed frames as compared to an original animated icon file with no frames removed, may sacrifice image quality and playback when reformatting to satisfy a file size (or other) requirement. A loss of frames from an animation file may affect the playback experience for a user. In an implementation, the action of reformatting attempts to achieve relatively high image quality and playback while still trying to meet a pre-defined size requirement. The reformatting processing makes an estimate of ways to turn, for example, a larger animation file into a smaller animation file. In an implementation the action of reformatting attempts to balance different sub operations such as removing frames, resizing frames, and dropping color palettes to limit image and playback degradation.

FIG. 9 is a flow diagram of an example process 900 of reformatting an animation file to generate an animated icon to satisfy pre-defined size requirements of an instant messaging environment. The animation file includes frames. This flow diagram shows one example of how action 806 (formatting) of FIG. 8 may be performed. In an implementation, the processing device 102 removes (902) individual frames of the animation file. In some implementations, removing frames takes into account the frame delays corresponding to frames of the animation file to limit image and playback degradation. In other implementations, frames are removed without consideration of the potential impact on image and/or playback degradation. The action of removing (902) is described further below with regard to example process 1100 of FIG. 11.

The processing device 102 drops (904) a color palette from the animation file. This may serve to reduce the size of the animation file so as to, for example, better satisfy a file size requirement. Of course, more than one color palette may be dropped as suitable. The processing device 102 resizes (906) frames of the animation file. Since the example process 900 of reformatting the animation file tends toward reducing a size attribute of the animation file, the action of resizing (906) will typically involve cropping the frames to reduce the size of the frames-thus affecting the aspect ratio of the animation file. Note that in some cases increasing the aspect ratio along one dimension of the frame may by itself, or in combination with the removing, actually decrease the file size; therefore, resizing is not limited to decreasing the frame size. The frame aspect ratio may depend on the compression standard employed by the process 900.

The processing device 102 compresses (908) the animation file using standard compression techniques. For example, the compression (908) might be performed according to the H.263 standard, or the H.264 standard.

The processing device repeats (910) actions 902 through 908 until an animated icon is generated that satisfies a pre-defined size requirement. As discussed, for example, the pre-defined size requirement may include a either a file size requirement, or a frame size requirement, or both.

Other implementations than those matching the example reformatting process 900 are possible. For example, reformatting may include only removing individual frames, without resizing frames, or dropping color palettes. Similarly, removing individual frames may be combined with dropping color palettes without resizing of frames. Likewise, removing individual frames may be combined with resizing frames without including dropping color palettes. Moreover, a reformatting process need not repeat (e.g., 910) suboperations such as removing, resizing or dropping and instead these suboperations may be cycled through only once, for example, with no repetition. Generally, any combination, or partial combination, or order of the actions of removing (e.g., 902), dropping (e.g., 904), resizing (e.g., 906), compressing (e.g., 908), and repeating (e.g., 910) may be employed to reformat an animation file.

FIG. 10 is a flow diagram of another example process 1000 of reformatting an animation file to generate an animated icon to satisfy pre-defined file and frame size requirements of an instant messaging environment. The animation file includes frames. In the particular example process 1000 shown in FIG. 10, there are three size requirements, a maximum file size requirement, a maximum frame size requirement, and a minimum frame size requirement. This flow diagram shows an example, more detailed than that shown in FIG. 9, of one way in which action 806 (reformatting) of FIG. 8 may be performed.

Proceeding through the diagram, decision 1002 asks whether the file size of the animation file is less than or equal to a maximum file size requirement. If the file size of the animation file exceeds the maximum file size requirement (a "NO" answer to the decision), processing continues to action 1004, so that processing device 102 removes (1004) individual frames of the animation file. The action of removing (1004) is described further below with regard to example process 1100 of FIG. 11.

In an implementation, the action of removing (1004) may be repeated until the file size of the animation is less than the maximum file size requirement (as at decision 1002). In this implementation the algorithm may skip the dropping (1006) and resizing (1008) actions and proceed to the action of compressing (1010).

Processing continues to action 1006, at which processing device 102 drops a color palette from the animation file. Of course, more than one color palette may be removed as suitable. The processing device resizes (1008) the frames of the animation file and compresses (1010) the animation file. After compression, processing continues back to decision 1002 to compare the new animation file size with the maximum file size requirement. If the file size of the animation file once again exceeds the maximum file size, the processing loop of removing (1004), dropping (1006), resizing (1008) and compressing (1010) will be repeated until the file size is less than or equal to the maximum file size (a "YES" answer to the decision 1002), at which point processing continues to decision 1012.

At decision 1012, the file size is now less than or equal to the maximum file size requirement and decision 1012 asks whether the frame size of the animation file is less than or equal to a maximum frame size requirement. If the animation file frame size exceeds the maximum frame size (a "NO" answer to the decision), then processing returns to action 1008, so that the processing device 102 resizes the frames of the animation file.

If the animation file frame size is less than or equal to the maximum frame size requirement (a "YES" answer to decision 1012), processing continues to decision 1014, which asks whether the frame size is greater than or equal to a minimum frame size requirement.

If the frame size of the animation file is less than the minimum frame size requirement (a "NO" answer to the decision), processing continues to action 1016, at which the processing device 102 pads the frames of the animation file to meet or exceed the minimum frame size requirement. This may be accomplished, for each frame of the animation file, by placing a white transparent image with a larger frame size over the initial existing frame, so that the new padded frame appears to have a border along two sides, or all four sides, around or along the image displayed in the initial frame. Other padding techniques are possible. A compression action (not shown) may following the padding (1016).

Processing continues back to decision 1012 to once again compare the new animation file padded frame size with the maximum frame size requirement. Assuming the frame size requirement has not been exceeded, processing will loop and the frames of the animation file will be further padded (1016) until the frame size of the animation file is greater than or equal to the minimum frame size (a "YES" answer to decision 1014). In this event, processing continues to another decision 1018, which, like decision 1002, asks whether the file size of the animation file is less than or equal to the maximum file size requirement. A "NO" answer to this decision 1018 returns the processing to actions 1004 through 1010 et al., while a "YES" answer to decision 1018 means that the file size is still less than or equal to the maximum file size and the processed animation file becomes the animated icon, that is, the animated icon (the reformatted animation file) is "generated" (1020) from the initial animation file.

It will be understood that the flow diagram of example process 1000 is one way in which the reformatting of the animation file may be implemented, and that other suitable ways are possible. For example, reformatting may include only removing individual frames, without resizing frames, or dropping color palettes. Similarly, removing individual frames may be combined with dropping color palettes without resizing of frames. Likewise, removing individual frames may be combined with resizing frames without including dropping color palettes. Moreover, a reformatting process need not repeat suboperations such as removing, dropping, resizing, or padding and instead these suboperations may be cycled through only once, for example, with no repetition. Generally, any combination, or partial combination, or order of the actions of removing (e.g., 1004), dropping (e.g., 1006), resizing (e.g., 1008), padding (e.g., 1016), and compressing (e.g., 1010) may be employed to reformat an animation file.

FIG. 11 is a flow diagram of an example process 1100 of removing individual frames of an animation file. This flow diagram shows a detailed example of one way in which action 902 (removing) of FIG. 9 and action 1004 (removing) of FIG. 10 may be performed. A processing device 102 determines (1102) a number of individual frames to remove based on a percentage of frames in the animation file. For example, if there are 1000 frames in the animation file, and the device 102 is set to remove 10 percent of the frames in one run-through of the process 1100, then the process 1100 determines (1102) that 100 frames of the animation file are to be removed. Of course, other percentages are possible, as suitable. A relatively small percentage allows for iterations of the removing process 1100 that result in a gradually smaller animation file, which helps to limit image and playback degradation. Conversely, a percentage of 50 percent would be less desirable because, while removing half of all frames in the animation file would tend to reduce the file size, the viewing experience would likely be noticeably and adversely affected for a user playing back the file. However, any suitable percentage may be used.

The processing device 102 examines (1104) delay values corresponding to frames of the animation file. In an implementation, each frame of the animation file, for example, a GIF animation file, is tagged with a delay value that indicates how long the frame is to be played.

The processing device 102 identifies (1106) individual frames of the animated file having corresponding delay values that are less than a pre-defined delay value.

The processing device 102 removes (1108) the individual frames having corresponding delay values that are less than the pre-defined delay value, up to the predetermined number, spaced proportionately throughout the animation file. For example, the processing device earlier determined (1102) that 100 frames were to be removed. Thus, in this example, up to 100 of the individual frames having delay values less than the pre-defined delay value would be removed. According to the action 1108, the processing device would remove these frames not in one specific area of the animation file, but rather spaced proportionately throughout the animation file, with the intent of limiting image and playback degradation.

A new pre-defined delay value may be generated each time process 1100 is performed, based on the number of frames, if any, remaining having delay values less than the pre-defined delay value after the action of removing (1108) was performed.

Of course, other processes are possible. In another implementation, a process of removing frames of an animation file may include the same actions 1102 and 1104 of FIG. 11, but would have different additional steps. After action 1104 (examining), the processing device 102 may identify individual frames of the animation file having the longest and shortest corresponding delay values. In other implementations, only the shortest delay values or the longest delay values are identified. Next, the processing device 102 may remove the individual frames with the shortest corresponding delay values, up to the predetermined number, spaced proportionately throughout the animation file. If the processing device earlier determined that 100 frames were to be removed, then up to 100 of the individual frames with the shortest corresponding delay values may be removed. The processing device may remove these frames not in one specific area of the animation file, but rather spaced proportionately throughout the animation file, with the intent of limiting image and playback degradation.

In another implementation, the processing device may find "key" frames, i.e., those frames having the highest corresponding delay values, and may designate all non-"key" frames as eligible for removal. Then, a number of frames, again based on a percentage of frames in the animation file, may be selected for removal from the set of non-"key" frames. These frames may be spaced proportionately throughout the file.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof. Hardware on the client and/or server side may be, e.g., part of a desktop or laptop personal computer, a personal digital assistant (PDA), a cellular or other mobile telephone, a personal media player, etc.

All or part of the processes can be implemented as a computer program product, e.g., a computer program tangibly embodied in an information carrier, e.g., in one or more machine-readable storage media or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the processes can be implemented in a computing system that includes a back-end component, e.g., as a data server, or that includes a middleware component, e.g., an application server, or that includes a front-end component, e.g., a client computer having a graphical user interface, or any combination of such back-end, middleware, or front-end components. The components of the system can be interconnected by any form or medium of digital data communication, e.g., a communication network. Examples of communication networks include a LAN and a WAN, e.g., the Internet.

Actions associated with the processes can be rearranged and/or one or more such actions can be omitted to achieve the same, or similar, results to those described herein.

In using the term "may," it is understood to mean "could, but not necessarily must."

Elements of different implementations described herein may be combined to form other embodiments not specifically set forth above. Other implementations not specifically described herein are also within the scope of the following claims.

What is claimed is:

1. A non-transitory computer-readable medium including instructions which, when executed by one or more processors, causes:
reformatting an animation file having a plurality of frames to generate an animated icon that satisfies a pre-defined size requirement of an instant messaging environment;
identifying individual frames to remove from the animation file based on delay values of the individual frames;
removing the individual frames from the animation file to generate the animated icon; and
storing the animated icon for distribution to the instant messaging environment.

2. The non-transitory computer-readable medium of claim 1, further comprising instructions that cause:
applying a user-selected image editing operation across two or more frames of the animation file.

3. The non-transitory computer-readable medium of claim 1, wherein the instructions that cause applying the user-selected image editing operation comprise instructions that cause applying image altering effects across two or more frames of the animation file.

4. The non-transitory computer-readable medium of claim 1, wherein the instructions that cause applying the user-selected image editing operation comprise instructions that cause applying image filters across two or more frames of the animation file.

5. The non-transitory computer-readable medium of claim 1, wherein the instructions that cause applying the user-selected image editing operation comprise instructions that cause:
applying image altering effects and image filters across two or more frames of the animation file;
wherein the image altering effects comprise at least one of stretching the image, squeezing the image, mirroring the image, or otherwise warping the image; and
wherein the image filters comprise at least one of recoloring the image, restyling the image, or copying the image.

6. The non-transitory computer-readable medium of claim 1, further comprising instructions that cause:
generating the animation icon from one or more frames in accordance with instructions received from a user.

7. The non-transitory computer-readable medium of claim 1, further comprising instructions that cause:
distributing the animated icon over a communications network to the instant messaging environment;
wherein the animated icon uniquely identifies a user in the instant messaging environment; and
wherein the instant messaging environment is provided by an instant messaging service provider.

8. The non-transitory computer-readable medium of claim 1, wherein the pre-defined size requirement comprises a maximum file size requirement.

9. The non-transitory computer-readable medium of claim 1, wherein the instructions that cause reformatting the animation file to generate the animated icon comprise instructions that cause:
removing the individual frames from the animation file;
compressing the animation file; and
repeating removing and compressing until the animated icon satisfies the pre-defined size requirement.

10. The non-transitory computer-readable medium of claim 9, wherein the instructions that cause removing the individual frames comprises instructions that cause removing individual frames having corresponding delay values that are less than a pre-defined delay value.

11. The non-transitory computer-readable medium of claim 1, wherein the instructions that cause reformatting the animation file to generate the animated icon comprise instructions that cause:
resizing the frames of the animation file;
compressing the animation file; and
repeating resizing and compressing until the animated icon satisfies the pre-defined size requirement, wherein the pre-defined size requirement comprises a maximum frame size requirement.

12. The non-transitory computer-readable medium of claim 1, wherein the instructions that cause reformatting the animation file to generate the animated icon comprise instructions that cause:
removing individual frames of the animation file;
resizing the frames of the animation file;
dropping a color palette from the animation file;
compressing the animation file; and
repeating removing, resizing, dropping, and compressing until the animated icon satisfies the pre-defined size requirement.

13. The non-transitory computer-readable medium of claim 1, wherein the instructions that cause reformatting the animation file to generate the animated icon comprise instructions that cause:
removing individual frames of the animation file;
compressing the animation file;
comparing the animation file with the pre-defined size requirement; and
if the animation file exceeds the pre-defined size requirement,
repeating removing, compressing, and comparing until the pre-defined size requirement is satisfied; and
if the animation file does not exceed the pre-defined size requirement,
generating the animated icon.

14. The non-transitory computer-readable medium of claim 1, wherein the instant messaging environment comprises one of multiple instant messaging environments; and
wherein the pre-defined size requirement comprises a single maximum file size requirement that represents a least common denominator value acceptable to the multiple instant messaging environments, wherein the multiple instant messaging environments are provided by multiple instant messaging service providers.

15. An instant messaging client comprising:
memory configured to store an animated icon for distribution to the instant messaging environment and to store instructions for execution; and
a processing device configured to execute the instructions to process an animation file having a plurality of frames to generate the animated icon, the instructions for causing the processing device to:
reformat the animation file to generate the animated icon to satisfy a pre-defined size requirement of the instant messaging environment;
identify individual frames to remove from the animation file based on delay values of the individual frames; and
removing the individual frames from the animation file to generate the animated icon.

16. The instant messaging client of claim 15, further comprising instructions for causing the processing device to:
generate the animation icon from one or more frames; and
apply a user-selected image editing operation across two or more frames.

17. The instant messaging client of claim 15,
wherein the instructions for causing the processing device to reformat the animation file to generate the animated icon comprise causing the processing device to remove individual frames of the animation file, the individual frames having corresponding delay values that are less than a pre-defined delay value.

18. The instant messaging client of claim 15, further comprising instructions for causing the processing device to:
generate a graphical user interface;

wherein the graphical user interface is configured to provide a user with access to and at least some control over the instructions that the processing device is configured to execute.

19. A method comprising:
reformatting the animation file having a plurality of frames to generate the animated icon to satisfy a pre-defined size requirement of the instant messaging environment;
identify individual frames to remove from the animation file based on delay values of the individual frames;
removing the individual frames from the animation file to generate the animated icon; and
storing the animated icon for distribution to the instant messaging environment;
wherein the method is performed by one or more processors.

20. The method of claim 19, further comprising:
generating the animation icon from one or more frames; and
applying a user-selected image editing operation across two or more frames of the animation icon.

21. The method of claim 20, wherein reformatting the animation file to generate the animated icon comprises:
removing individual frames of the animation file;
compressing the animation file; and
repeating removing and compressing until the animated icon satisfies the pre-defined size requirement.

22. An animated icon editor integrated within an instant messaging application for reformatting and modifying an animation file comprising frames, the icon editor comprising:
a reformatting process configured to automatically manipulate one or more frames of the animation file to satisfy sizing parameters, including identifying one or more individual frames from the animation file based on delay values of the one or more individual frames and removing the identified individual frames;
a modifying process configured to apply image editing operations to two or more frames of the animation file; and
a storage process configured to store an animated icon generated by the reformatting process and the modifying process from the animation file.

23. The animated icon editor of claim 22, wherein the animated icon editor further comprises:
a formation process configured to build the animation file from the frames.

* * * * *